US006945708B2

(12) United States Patent
Crafts et al.

(10) Patent No.: US 6,945,708 B2
(45) Date of Patent: Sep. 20, 2005

(54) PLANAR LIGHTWAVE CIRCUIT PACKAGE

(75) Inventors: Douglas E. Crafts, San Jose, CA (US);
James F. Farrell, San Jose, CA (US);
Mark B. Farrelly, San Jose, CA (US);
Duane Cook, San Jose, CA (US);
Satyanarayana Rao Peddada, San Jose, CA (US)

(73) Assignee: JDS Uniphase Corporation, San Jose, CA (US)

(*) Notice: Subject to any disclaimer, the term of this patent is extended or adjusted under 35 U.S.C. 154(b) by 139 days.

(21) Appl. No.: 10/368,195

(22) Filed: Feb. 18, 2003

(65) Prior Publication Data

US 2004/0161186 A1 Aug. 19, 2004

(51) Int. Cl.[7] .................................................. G02B 6/12
(52) U.S. Cl. ............................. 385/89; 385/14; 385/88; 385/94
(58) Field of Search .............................. 385/14, 88–94, 385/120

(56) References Cited

U.S. PATENT DOCUMENTS

| 5,170,455 | A |   | 12/1992 | Goossen et al. ............... 385/89 |
| 5,586,207 | A |   | 12/1996 | Goodwin ...................... 385/92 |
| 6,137,929 | A |   | 10/2000 | Rosenberg et al. ........... 385/31 |
| 6,160,606 | A |   | 12/2000 | Sprague ....................... 349/159 |
| 6,238,100 | B1 | * | 5/2001 | Sasaki et al. ................. 385/59 |
| 6,318,909 | B1 |   | 11/2001 | Giboney et al. .............. 385/90 |
| 6,507,680 | B1 |   | 1/2003 | Nishimura et al. ........... 385/14 |

FOREIGN PATENT DOCUMENTS

WO    WO 02/39155 A2    5/2002

* cited by examiner

*Primary Examiner*—Rodney Bovernick
*Assistant Examiner*—Kevin S. Wood
(74) *Attorney, Agent, or Firm*—Allen, Dyer, Doppelt, Milbrath & Gilchrist, P.A.

(57) ABSTRACT

An optical packaging arrangement combines a planar lightwave circuit (PLC) having an array of waveguides thereon, an array of photodetectors on a substrate to receive light beams coupled out of the PLC by the output ports, and a collimating faceplate, having a plurality of glass cores, extending between the PLC and the photodetector array for coupling the output light beams to respective photodetectors. The faceplate forms a cover for a hermetic cavity encompassing the photodetectors. The PLC is disposed either co-planarly with the faceplate or transversely to it. Light from the PLC is tapped via a plurality of taps formed on the PLC for coupling to the photodetectors.

9 Claims, 4 Drawing Sheets

PLANAR LIGHTWAVE CIRCUIT PACKAGE

RELATED APPLICATION none

FIELD OF THE INVENTION

This invention relates generally to optical data communication devices and more specifically, to a packaging arrangement for optical telecommunications, the arrangement including an array of optical input ports, e.g. a planar lightwave circuit, and a plurality of photodetectors, the optical input array being optically coupled with the photodectors.

BACKGROUND OF THE INVENTION

Planar lightwave circuits (PLC) are well known in optical communications. They are formed on various substrates and include a network of waveguides, for example channel waveguides. An example of a PLC is shown in U.S. Pat. No. 6,507,680 issued Jan. 14, 2003 to Nishimura et al.

In the design of PLC architectures, it is important to properly integrate the taps and photodetectors with the optical transmission channels e.g. channel waveguides. In Nishimura, the photodetectors are integrated with the PLC and arranged for evanescent coupling.

It is also known to mount a photodetector in the path of a light beam for direct detection of a (tapped) light beam incident on the photodetector.

It is important to keep the photodetector(s) in a hermetically sealed housing as contaminants such as dust particles, water vapor or condensate, dust, fumes, smoke and other pollutants can adversely affect the photodetector's performance.

It is also desirable, when designing a planar lightwave circuit arrangement including a separate (i.e. not integral) photodetector (PD) or a PD array, to provide a spacing between the PLC and the PD array. The spacing should be sufficient to prevent a direct contact between the PLC and the photodetector array, but not excessive to avoid an undesirable divergence of a light beam tapped out of the PLC towards the PD array. The current embodiment utilizes a 200 $\mu$m spacing between the collimating plate and the photodetector array. This allows light to fill most of the photodetector element which is typically 80 $\mu$m in diameter. The light emerges from the waveguide at approximately 8 $\mu$m in diameter with a divergence angle of 12 degrees. The spacing between the collimating plate and photodetector allows the light to diverge to a 60 $\mu$m spot, thus filling most of the photodetector element. These dimensions can change depending on the photodetector element diameter selected. It is always desirable to fill at least a major part of the photodetector element, irrespective of the selected element nominal diameter. The secondary advantage of spacing the collimating plate from the photodetector array is that it prevents mechanical stresses from the outside surface of the collimating plate from being impeded into the photodetector array.

In an arrangement where the PD array is not an integral part of the PLC, the hermeticity requirement can be met by designing casings encompassing the entire PLC arrangement, i.e. the PLC with taps and the photodetector array. This however is a relatively costly solution. It is desirable to reduce the cost of a hermetic arrangement of the above-discussed type without sacrificing the hermeticity of the package and the quality of optical coupling between the PLC (specifically, the optical taps) and the respective photodetectors.

The prior art includes various examples of coupling between optical waveguides and photodetectors. U.S. Pat. No. 5,586,207 issued Dec. 17, 1996 to Northern Telecom describes methods and assemblies for packaging optoelectronic devices including a method of coupling an optical fiber to a packaged device using a collimating faceplate composed of parallel sections of optical fibers.

Collimating faceplates are also used in other arrangements, e.g. described in U.S. Pat. No. 6,160,606 to Sprague; U.S. Pat. No. 6,137,929 to Rosenberg et al; 6,318,909 to Giboney et al.; U.S. Pat. No. 5,170,455 to Giboney et al; U.S. Pat. No. 5,170,455 to Goossen et al; and WO 02/39155 published May 16, 2002.

SUMMARY OF THE INVENTION

In accordance with the invention, there is provided a packaging arrangement including a fixed array of optical input ports, for example a planar lightwave circuit (PLC), a liquid crystal display or a diode laser array. In the embodiment where the array is a PLC, the PLC defines at least one major surface having an array of waveguides thereon. The array of waveguides also includes one or more output ports e.g. optical taps or equivalent light diverting means for coupling light beams propagating in the PLC, or their portions, out of the PLC.

The package of the invention further comprises an array of photodetectors disposed on a photodetector substrate to receive light beams coupled out of the array, e.g. a PLC, by the output ports, and a collimating faceplate extending between the PLC and the photodetector array for coupling the output light beams to respective photodetectors. The faceplate is dimensioned and configured to form, along with the photodetector substrate, a hermetic cavity encompassing the photodetectors.

The definition "fixed array" denotes a permanent array with a predetermined spatial relationship between the components of the array, e.g. laser diodes, or waveguide outputs of a PLC, as opposed to a loose bundle of optical fibers.

In one embodiment of the invention wherein the fixed array of input ports is a PLC, the faceplate is planar and the PLC is disposed co-planarly therewith, i.e. with its major surface contiguous with one surface of the faceplate while the opposite surface of the faceplate is disposed to face the photodetectors for the coupling of light beams, or their portions, propagating in the PLC, to the photodetectors.

In another embodiment of the invention, the PLC is disposed transversely to the faceplate, i.e. with a side wall of the PLC facing the faceplate.

The PLC may be spaced from the faceplate, preferably by a distance not impairing the coupling of light signals from the PLC to the photodetectors. Alternatively, the PLC may be in contact with the faceplate, directly or with an adhesive joint using a light-transmissive adhesive such as an index-matched epoxy adhesive.

The PLC may be embodied by a known arrayed waveguide grating (AWG) module.

It is a feature of the invention that the faceplate and a photodetector carrier can form a hermetic cavity while allowing optical energy to reach the photodetector array through the transparent cores of the faceplate. The faceplate thus offers a sealing function in an economical manner (without necessitating a hermetic enclosure over the entire PLC circuit) while also providing transparency for collimated light transmission from the PLC, either through free-space or direct coupling.

BRIEF DESCRIPTION OF THE DRAWINGS

The invention will now be described in more detail by way of the following description in conjunction with the drawings in which like reference numerals represent like elements and in which.

DETAILED DESCRIPTION OF THE INVENTION

Figure 1:
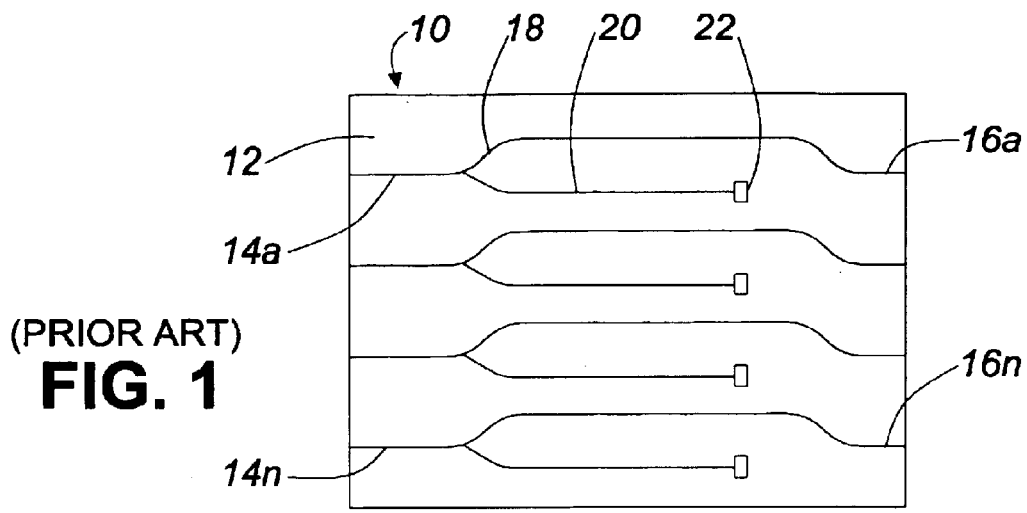
FIG. 1 is a schematic plan view of a conventional planar lightwave circuit (PLC)

Turning first to FIG. 1 (prior art), a typical planar lightwave circuit (PLC) 10 is shown schematically. The PLC has a planar substrate 12, a plurality of input channel waveguides 14a–14n and a plurality of output channel waveguides 16a–16n. Each input waveguide is provided with a 5%-95% coupler 18 thus defining 95% arms extending into output waveguides 16a–16n, and a plurality of 5% arms 20. The 5% arm 20 of every coupler ends with a tap 22. The taps are formed by metallized mirror surfaces disposed at an angle, approximately 45°, to the propagation axis of a light beam propagating in the 5% arm 20.

The taps 22 can be made for example by etching the angled reflective surfaces into the waveguide followed by depositing gold onto the reflective surface using a sputtering process.

In an embodiment of the invention, the taps are created by RIE (reactive ion etching) of a 45-degree notch through the cladding and core, followed by deposition of a reflective metal coating on the opposite side of the notch, thus producing a reflective surface for directing the light into the collimating faceplate.

Alternatively, the taps can be realized by partly transparent, partly reflective mirror surfaces provided at an angle (e.g. 45°) in the path of optical beams propagating in the channel waveguides to couple a predetermined portion of light propagating in the respective waveguides out of the PLC to be detected as described below.

The mirror surfaces may be mounted in grooves, e.g. V-grooves provided across the path of the respective waveguides in the planar substrate.

Figure 2:
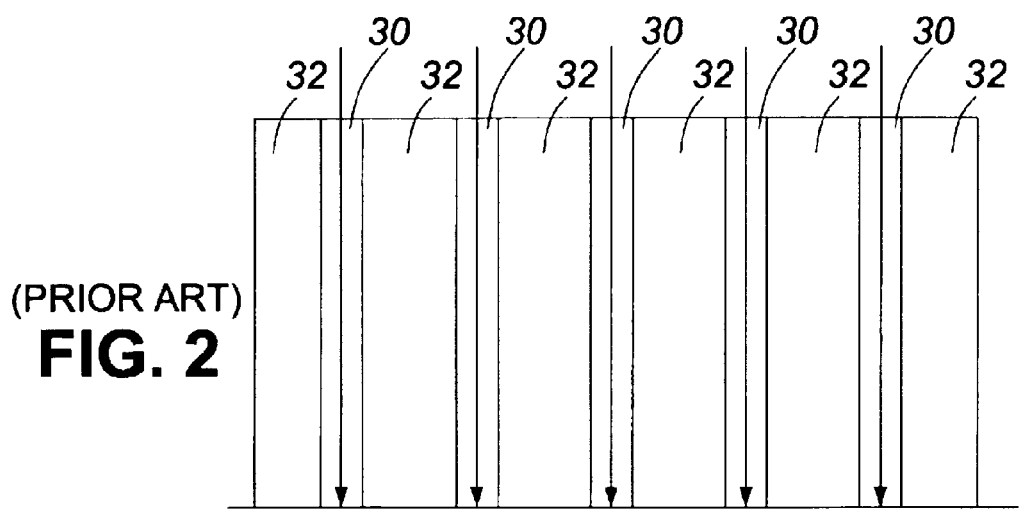
FIG. 2 is a schematic cross-sectional view of a conventional collimating faceplate.

Turning now to FIG. 2, a conventional collimating faceplate is shown. Functionally, as well known in the art, the faceplate is a plurality of glass (or another transparent material) fiber cores 30 of a diameter from approx. 3 to 10 μm, the cores having a relatively high numerical aperture and being embedded in a transparent, partly transparent or opaque material 32 that serves as a cladding to the core. The refractive index of the cores 30 should be higher than the refractive index of the cladding material to enable the total internal reflection of any light entering the core 30.

Figure 2A:
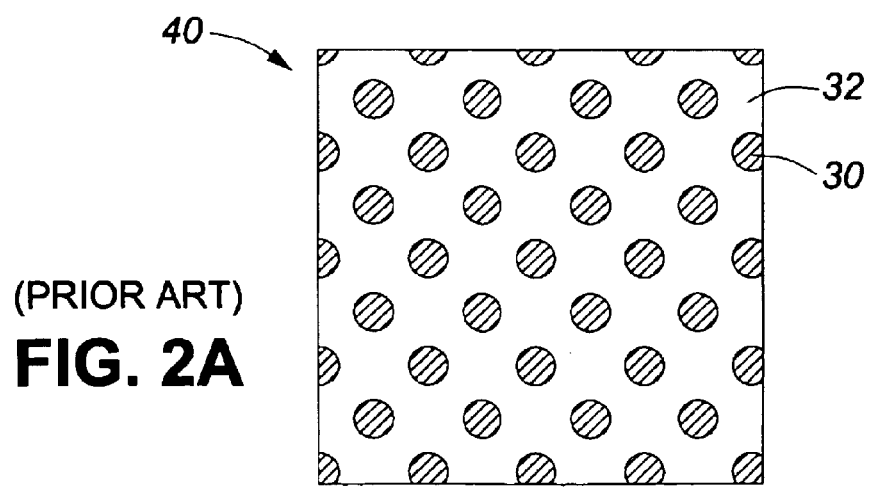
FIG. 2A is a plan view of the collimating faceplate of FIG. 2.

FIG. 2A illustrates the faceplate of FIG. 2 in a plan view showing a major surface 40 of the faceplate with the shaded areas denoting the cores 30 and cladding areas 32 between the cores 30.

Figure 3:
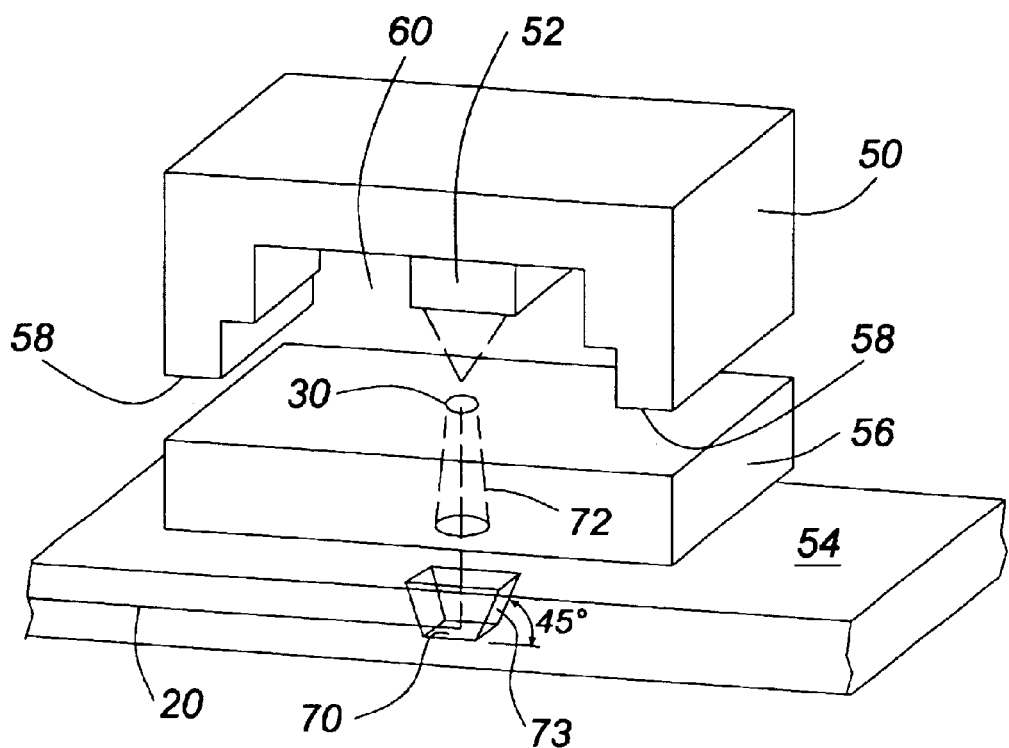
FIG. 3 is an exploded cross-sectional view of an embodiment of the PLC packaging assembly of the invention.

An embodiment of the packaging arrangement of the present invention is shown in FIG. 3. A ceramic photodetector carrier 50, shown without its front wall, houses a commercially available InGaAs photodetector array 52. The array has a plurality of separate photodiodes, at least corresponding in number to the number of taps (not shown in FIG. 3) on the associated planar lightwave circuit 54. The upper major surface of the circuit 54 extends along the, cavity defined by the walls of the carrier 50 and is separated from the cavity by a collimating faceplate 56. The faceplate 56, approximately 1.2 mm in thickness, is at least co-extensive with the bottom walls 58 of the carrier 50 and is shaped to match the walls 58 to provide a sealed cover for the cavity 60 of the carrier 50. In a simplest embodiment, the faceplate has a planar surface facing the cavity and the bottom walls 58 of the carrier 50 define a plane, but other surface configurations are also feasible provided that the faceplate 56 matches the bottom walls to provided a sealing cover for the cavity 60.

The faceplate may be manufactured according to any of known techniques, for example as per the U.S. Pat. No. 6,160,606 (Sprague).

The cavity 60 housing the photodetector array 52 may be filled with air or another gas, e.g. an inert gas, and should be free from deleterious contaminants jeopardizing the functioning of the photodetector array as explained above.

The planar lightwave circuit 54 includes a number of channel waveguides as illustrated in FIG. 1. Only one waveguide section (arm) 20 is shown schematically in FIG. 3. A V-groove 70 is formed by etching in the PLC 54 in the path of the arm 20. The left-side wall of the V-groove is transmissive, while the right-side wall, disposed at 45° to the propagation axis of the arm 20 has a reflective surface formed by sputtering of a metal layer 73. Thus, light propagating from the left in the waveguide arm 20 passes through the left wall of the V-groove and reflects from the right wall of the V-groove upwards i.e. towards the photodetector array via a core area 72 (indicated in phantom lines) of the faceplate 54.

Alternatively, it is possible to apply a reflective coating onto the output facet (edge) of the waveguide where light would normally emerge out of the waveguide. This would result in the light returning back through the original optical path formed by the waveguides. A 50% splitter could be applied near the input of the waveguide at which point the collimating photodetector package could be placed.

Figure 4:
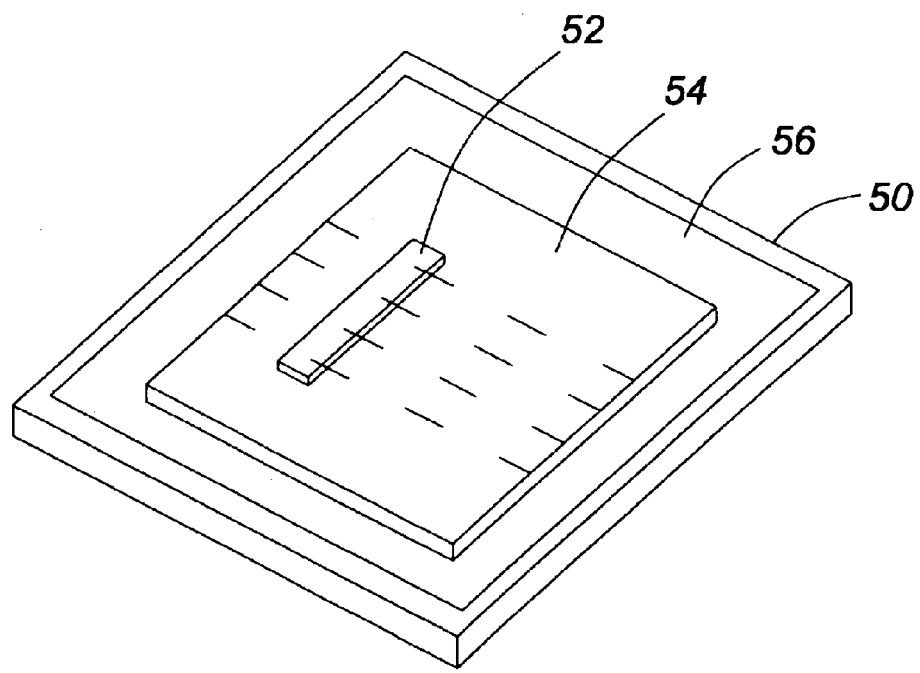
FIG. 4 is a perspectve view of the embodiment of FIG. 3.

An exemplary finished PLC package, or assembly, of the invention is represented schematically in FIG. 4. For more effective sealing of the faceplate to the photodetector carrier, a conventional sealing compound or alloy, e.g. a known Au/Sn alloy, may be applied at the matching surfaces of the faceplate 56 and the carrier 50. The photodetector array 52 is thus sealed in the cavity 60, with its electric leads (not illustrated) arranged in a manner not affecting the hermetic seal.

The components of the assembly illustrated in FIG. 4 are dimensioned such that the spacing between the faceplate 56 and the photodetector 52 is small, e.g. about 0.2 mm, to limit the effect of the inevitable divergence of light emerging from the faceplate towards the photodetector, as represented by the dashed lines in FIG. 4. On the other hand, the spacing should not be too small to alleviate the risk of contact between the faceplate and the photodetector with associated possibility of losing the seal between the faceplate and the photodetector substrate and a damage to the photodetector.

The PLC 54 may be positively attached to the faceplate 56 using an adhesive, e.g. a known UV (epoxy) adhesive, having a refractive index matched to the refractive index of the cores of the faceplate. To minimize light losses in the adhesive, a bond line thickness of about 10 µm or less is used.

Figure 5:
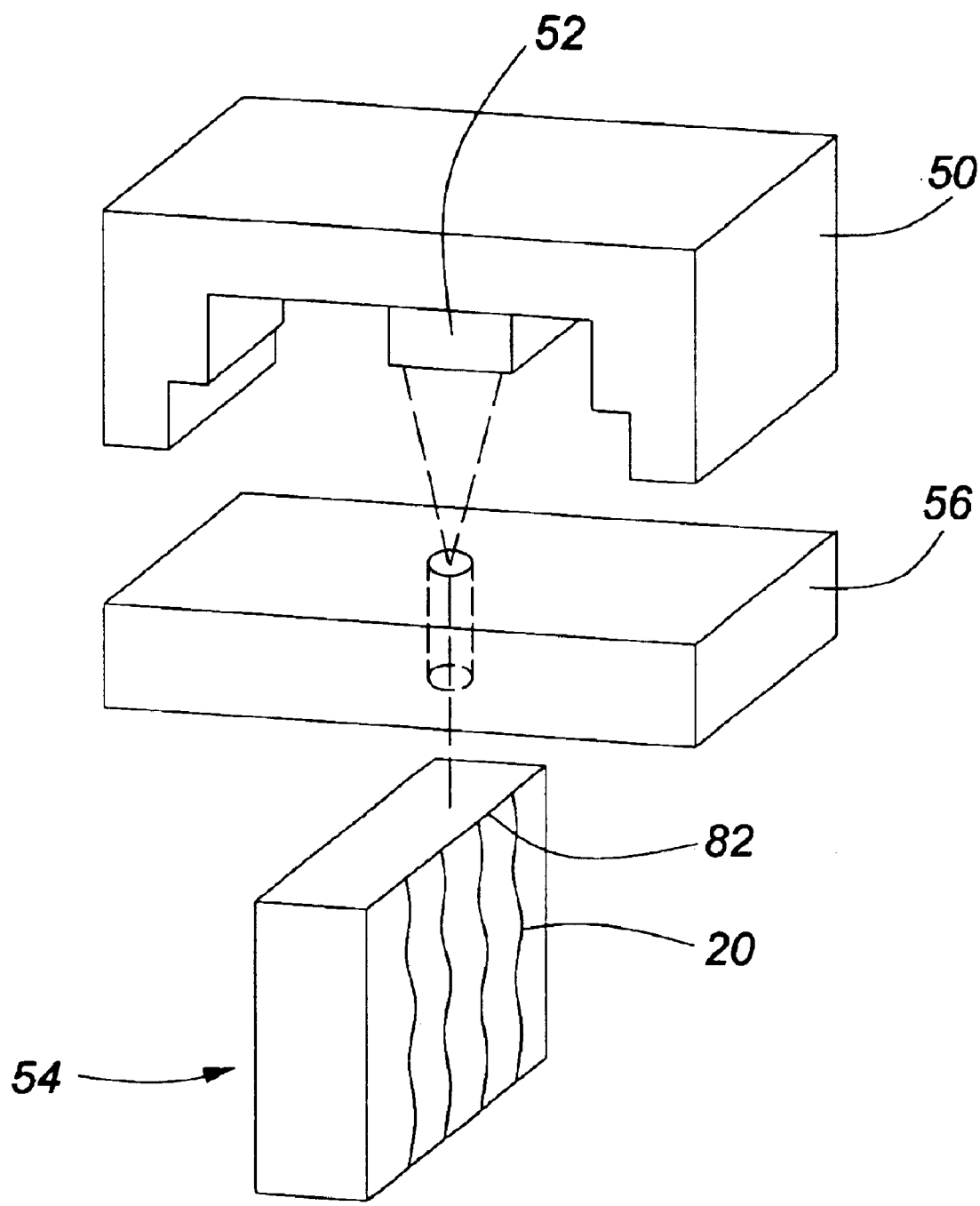
FIG. 5 illustrates an alternative arrangement of the PLC assembly of the invention.
Figure 6:
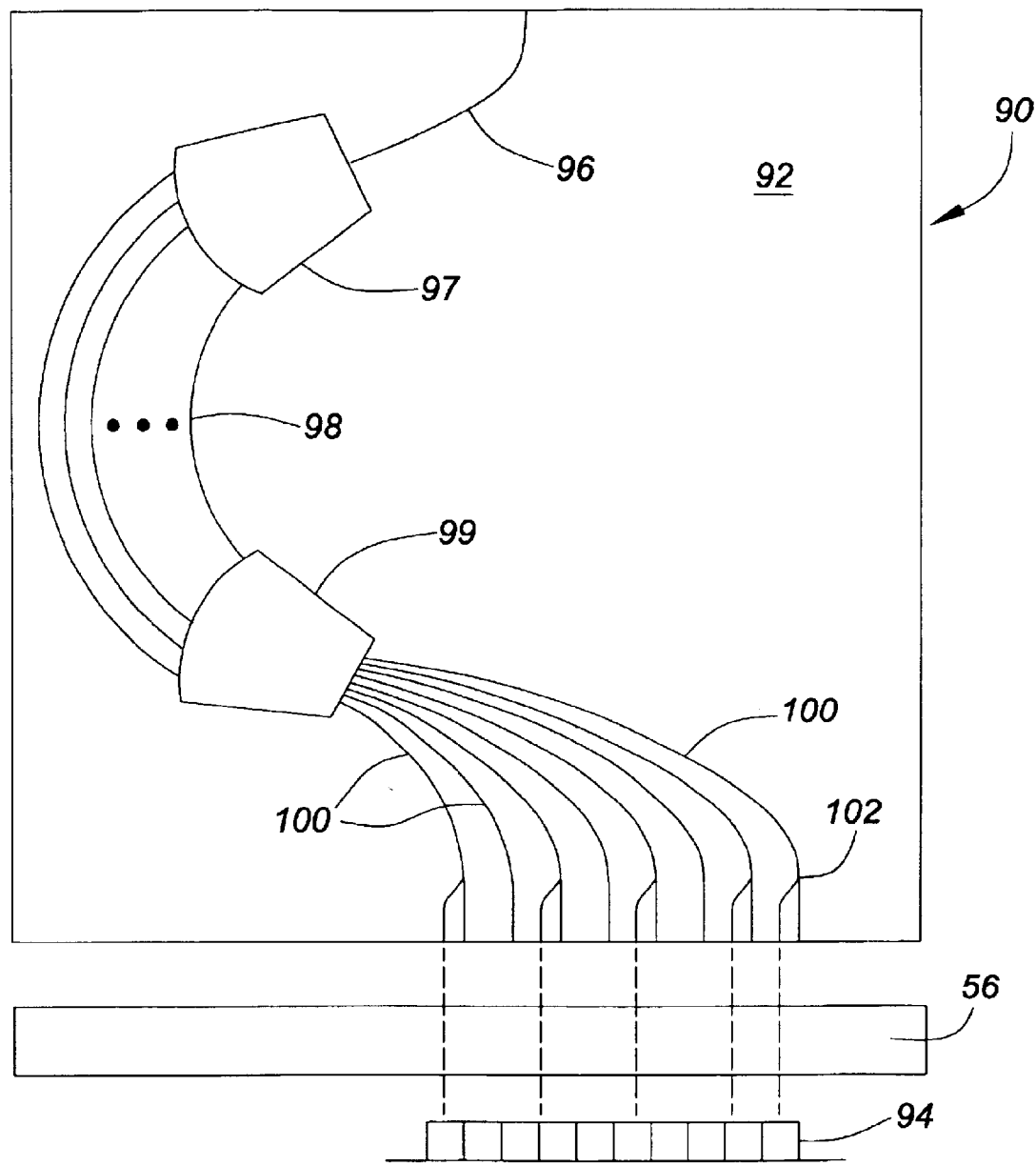
FIG. 6 illustrates an embodiment in which the PLC is an arrayed waveguide grating (AWG).

In an alternative embodiment of the invention represented schematically in FIG. 5, the PLC 54 is disposed differently than in FIG. 4. The major surface of the PLC 54 with the waveguides 20 is disposed transversely or approximately orthogonally (in a wide range of angles) relative to the major surface 80 of the faceplate 56, so that the PLC faces the faceplate with its side rather than the major surface. This arrangement allows for one or more of the output ends 82 of the waveguides 20, the ends defining output ports of the respective waveguides, to be aligned with respective core areas of the faceplate 56 and thus with respective photodetectors, without using taps. In the embodiment illustrated in FIG. 5, the waveguides 20 terminate with output ends (serving as input ports within the meaning of the present invention) such that the entire signal propagating in one of the waveguides is coupled out of the PLC through the output end (port) 82. Alternatively, the waveguides may have couplers as illustrated in FIG. 1 except that all the coupler arms may terminate at the same edge of the PLC. Such an arrangement is illustrated in FIG. 6 where the PLC 54 of FIG. 5 is represented by an arrayed waveguide grating (AWG) 90 arranged with its major surface 92 perpendicularly to the faceplate 56. The photodetector array is indicated schematically as 94. The AWG, arranged as a demultiplexer, has an input waveguide 96, a slab waveguide 97, an array waveguide portion 98, a slab waveguide 99 and a plurality of output optical waveguides 100. The output optical waveguides, or at least some of them, have directional couplers 102 serving as taps, wherein a tapped portion of light propagating in the output waveguide is directed to a respective photodetector in the array 94, while the rest of the light is coupled to a destination, not shown. The destination may be the edge of the PLC, where the light will be coupled into a fiber or into a free space optical device, not illustrated.

The collimating plate allows a majority of each photodetector element to be filled with light while not over-filling to the point of losing light or causing adjacent photodetector elements to pick up light from a single source.

The spacing between the collimating plate and the photodetectors can be selected to enable the use of photodetector arrays with varying element diameters. Closer spacing can be used to create a smaller light spot size for smaller photodetectors. Larger spacing can be used to fill larger elements in photodetector arrays where higher sensitivity is needed. Smaller diameter PD elements tend to be less sensitive but offer greater speed and lower electrical noise.

The use of the collimating plate provides a highly reliable hermetic package window without affecting the light beams that are directed towards the photodetector elements. The collimating faceplate prevents excessive beam divergence or beam angle changes which are key advantages in the packaging of photodetector arrays designed for the purpose of monitoring light emerging from multiple waveguides in a PLC ciurcuit.

The collimating faceplate can also enable free-space optical coupling to a photodetector array where direct bonding to a PLC is not an option. This can be done by placing the collimating faceplate very close (e.g. in a range of a few µm to a few hundred µm) but not in contact with the photodetector array. Up to 200 µm of spacing can then be allowed between the outside surface of the collimating plate (package) and the free-space light source. This spacing must be adjusted to match the photodetector element diameter in a way that is similar to the tuning techniques described hereinabove. As indicated above, the invention applicable to various arrays of optical input ports, such as liquid crystal displays (LCD) or laser diode (LD) arrays. FIG. 5 represents schematically, *mutatis mutandis*, such other arrangements wherein the element 54 represents a specific fixed array of optical input ports.

The invention eliminates the cumbersome fiber pigtailing to photodetectors. By controlling the divergence at the PD array through collimation by means of the faceplate, the spacing of the photodetectors in the PD array can be relatively close to accommodate closely spaced monitor waveguides on the associated PLC.

Of course, numerous other embodiments may occur to those versed in the art without departing from the scope of the invention as defined by the appended claims.

What is claimed is:

1. An optical circuit assembly comprising:
    a fixed array of optical input ports,
    a photodetector substrate defining a cavity,
    a photodetector array mounted in said cavity and disposed to receive at least one optical signal from the fixed array of input ports, and
        a faceplate comprising a plurality of substantially parallel optical fiber cores, the faceplate optically coupled between the fixed array and the photodetector and arranged such that at least some of said cores are aligned with the input ports and with the photodetector array,
    wherein the faceplate is disposed and dimensioned to define a sealing cover of the cavity wherein the fixed array is a liquid crystal display.

2. An optical circuit assembly comprising:
    a fixed array of optical input ports,
    a photodetector substrate defining a cavity,
    a photodetector array mounted in said cavity and disposed to receive at least one optical signal from the fixed array of input ports, and
        a faceplate comprising a plurality of substantially parallel optical fiber cores, the faceplate optically coupled between the fixed array and the photodetector and arranged such that at least some of said cores are aligned with the input ports and with the photodetector array, wherein the faceplate is disposed and dimensioned to define a sealing cover of the cavity wherein the fixed array is a diode laser array.

3. A planar lightwave circuit assembly comprising:
    a planar lightwave circuit (PLC) comprising at least one waveguide for propagating a light signal therethrough and an output port disposed for directing at least a part of the light signal out of the PLC,
    a photodetector substrate defining a cavity,
    a photodetector array mounted in said cavity and disposed to receive at least a part of the light signal from the output port, and
        a faceplate comprising a plurality of substantially parallel optical fiber cores, the faceplate optically coupled between the planar lightwave circuit and the photodetector and arranged such that at least one of said cores is aligned with the output port and with the photodetector, wherein the faceplate is disposed and dimensioned to define a sealing cover of the cavity wherein the PLC is disposed parallel to the faceplate wherein the planar lightwave circuit defines a major surface and comprises at least one optical tap disposed to couple at least part of the light signal propagating in the waveguide transversely to the manor surface.

4. The assembly of claim 3 wherein the optical tap comprises a V-groove having at least one reflective surface.

5. A planar lightwave circuit assembly comprising:

a planar lightwave circuit (PLC) comprising at least one waveguide for propagating a light signal therethrough and an output port disposed for directing at least a part of the light signal out of the PLC, a photodetector substrate defining a cavity, a photodetector array mounted in said cavity and disposed to receive at least a part of the light signal from the output port, and a faceplate comprising a plurality of substantially parallel optical fiber cores, the faceplate optically coupled between the planar lightwave circuit and the photodetector and arranged such that at least one of said cores is aligned with the output port and with the photodetector, wherein the faceplate is disposed and dimensioned to define a sealing cover of the cavity wherein a sealing alloy or sealing compound is disposed at an interface of the faceplate and said photodetector substrate for sealing the cavity.

6. A planar lightwave circuit assembly comprising:

a planar lightwave circuit (PLC) comprising at least one waveguide for propagating a light signal therethrough and an output port disposed for directing at least a part of the light signal out of the PLC, a photodetector substrate defining a cavity, a photodetector array mounted in said cavity and disposed to receive at least a part of the light signal from the output port, and a faceplate comprising a plurality of substantially parallel optical fiber cores, the faceplate optically coupled between the planar lightwave circuit and the photodetector and arranged such that at least one of said cores is aligned with the output port and with the photodetector, wherein the faceplate is disposed and dimensioned to define a sealing cover of the cavity wherein the PLC is spaced from the faceplate a distance permitting free space optical coupling between the PLC and the photodetector array.

7. A planar lightwave circuit assembly comprising:

a planar lightwave circuit (PLC) comprising at least one waveguide for propagating a light signal therethrough and an output port disposed for directing at least a part of the light signal out of the PLC, a photodetector substrate defining a cavity, a photodetector array mounted in said cavity and disposed to receive at least a part of the light signal from the output port, and a faceplate comprising a plurality of substantially parallel optical fiber cores, the faceplate optically coupled between the planar lightwave circuit and the photodetector and arranged such that at least one of said cores is aligned with the output port and with the photodetector, wherein the faceplate is disposed and dimensioned to define a sealing cover of the cavity wherein the PLC is in contact with the faceplate, wherein an optically transparent adhesive is disposed between the PLC and the faceplate.

8. A planar lightwave circuit assembly comprising:

a planar lightwave circuit (PLC) comprising at least one waveguide for propagating a light signal therethrough and an output port disposed for directing at least a part of the light signal out of the PLC, a photodetector substrate defining a cavity, a photodetector array mounted in said cavity and disposed to receive at least a part of the light signal from the output port, and a faceplate comprising a plurality of substantially parallel optical fiber cores, the faceplate optically coupled between the planar lightwave circuit and the photodetector and arranged such that at least one of said cores is aligned with the output port and with the photodetector, wherein the faceplate is disposed and dimensioned to define a sealing cover of the cavity, wherein the planar lightwave circuit is an arrayed waveguide grating (AWG).

9. A planar lightwave circuit assembly comprising:

a planar lightwave circuit (PLC) comprising at least one waveguide for propagating a light signal therethrough and an output port disposed for directing at least a part of the light signal out of the PLC, a photodetector substrate defining a cavity, a photodetector array mounted in said cavity and disposed to receive at least a part of the light signal from the output port, and a faceplate comprising a plurality of substantially parallel optical fiber cores, the faceplate optically coupled between the planar lightwave circuit and the photodetector and arranged such that at least one of said cores is aligned with the output port and with the photodetector, wherein the faceplate is disposed and dimensioned to define a sealing cover of the cavity, wherein the planar lightwave circuit defines a major surface disposed transversely to the faceplate, and the output port is disposed at an edge of the major surface, wherein the planar lightwave circuit is an arrayed waveguide grating (AWG).

* * * * *

UNITED STATES PATENT AND TRADEMARK OFFICE
CERTIFICATE OF CORRECTION

PATENT NO.    : 6,945,708 B2
DATED         : September 20, 2005
INVENTOR(S)   : Crafts et al.

It is certified that error appears in the above-identified patent and that said Letters Patent is hereby corrected as shown below:

Column 2,
Lines 13-15, "6,318,909 to Giboney et al; U.S. Pat. No. 5,170,455 to Giboney et al; U.S. Pat. No. 5,170,455 to Goossen et al;" should read -- 6,318,909 to Giboney et al; U.S. Pat. No. 5,170,455 to Goossen et al; --.

Column 7,
Line 9, "manor surface" should read -- major surface --.

Signed and Sealed this

Twenty-first Day of February, 2006

JON W. DUDAS
*Director of the United States Patent and Trademark Office*